(12) United States Patent
Namuduri et al.

(10) Patent No.: US 10,886,817 B2
(45) Date of Patent: Jan. 5, 2021

(54) ON-AXIS BRUSHLESS STARTER ASSEMBLY (71) Applicant: GM Global Technology Operations LLC, Detroit, MI (US)

(72) Inventors: Chandra S. Namuduri, Troy, MI (US); Lei Hao, Troy, MI (US); Alexandru Rajala, Farmington Hills, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 241 days.

(21) Appl. No.: 15/961,216

(22) Filed: Apr. 24, 2018

(65) Prior Publication Data
US 2019/0323475 A1 Oct. 24, 2019

(51) Int. Cl.
*H02K 5/15* (2006.01)
*H02K 5/22* (2006.01)
(Continued)

(52) U.S. Cl.
CPC .............. *H02K 7/083* (2013.01); *H02K 5/15* (2013.01); *H02K 5/225* (2013.01); *H02K 7/116* (2013.01);
(Continued)

(58) Field of Classification Search
CPC .......... H02K 7/006; H02K 7/083; H02K 7/10; H02K 7/116; H02K 7/118; H02K 7/1185;
(Continued)

(56) References Cited

U.S. PATENT DOCUMENTS

| 9,121,380 B2 | 9/2015 | Fulton | |
|---|---|---|---|
| 2010/0090633 A1* | 4/2010 | Deller | H02K 29/08 318/400.39 |

(Continued)

FOREIGN PATENT DOCUMENTS

| CN | 2711983 Y | 7/2005 |
|---|---|---|
| CN | 101487434 A | 7/2009 |

(Continued)

OTHER PUBLICATIONS

Shinjo, Machine Translation of JP2014075866, Apr. 2014 (Year: 2014).*

(Continued)

*Primary Examiner* — Quyen P Leung
*Assistant Examiner* — Eric Johnson
(74) *Attorney, Agent, or Firm* — Quinn IP Law (57) ABSTRACT

A starter assembly includes a partial planetary gear set connected to a pinion gear slidable along a first axis. The starter also includes a motor casing housing a brushless electric motor and having a first bearing. The motor includes multi-phase stator and rotor assemblies arranged inside the casing concentrically relative to the first axis. The rotor assembly has a rotor with a shaft supported by the first bearing and connected to a sun gear engaging the gear set, and a rotor position and speed sensor target. The starter additionally includes a motor end-cap for mating with and enclosing the motor casing and having a second bearing supporting the shaft. The starter also includes an electronics cover with a power connector for mating with the end-cap and housing an electronic commutator assembly. The commutator assembly includes power electronics, and control processor electronics arranged between the end-cap and the power electronics.

14 Claims, 4 Drawing Sheets

(51) Int. Cl.
*H02K 7/08* (2006.01)
*H02K 7/116* (2006.01)
*H02K 11/21* (2016.01)
*H02K 11/33* (2016.01)

(52) U.S. Cl.
CPC ............. *H02K 11/21* (2016.01); *H02K 11/33* (2016.01); *H02K 2211/03* (2013.01)

(58) Field of Classification Search
CPC ........ H02K 7/20; H02K 11/21; H02K 11/215; H02K 11/30; H02K 11/33; H02K 29/03; H02K 29/06; H02K 29/08; H02K 29/14; H02K 2211/03; H02K 5/15; H02K 5/22; H02K 5/225; F02N 11/0814
See application file for complete search history.

(56) References Cited

U.S. PATENT DOCUMENTS

| | | | | |
|---|---|---|---|---|
| 2011/0193435 A1* | 8/2011 | Andoh | ................ | F02N 11/087 310/83 |
| 2011/0254388 A1* | 10/2011 | Yamasaki | ........... | B62D 5/0406 310/43 |
| 2011/0254393 A1* | 10/2011 | Yamasaki | ............. | H02K 11/33 310/64 |
| 2011/0285223 A1* | 11/2011 | Miyachi | ................ | H02K 11/33 310/64 |
| 2013/0249356 A1* | 9/2013 | Nakano | ................ | H02K 11/33 310/68 D |
| 2013/0257232 A1* | 10/2013 | Tomizawa | ............. | H02K 29/08 310/68 R |
| 2014/0035445 A1* | 2/2014 | Uryu | ..................... | H02K 11/33 310/68 D |
| 2014/0091683 A1* | 4/2014 | Ito | ........................ | B62D 5/0406 310/68 R |
| 2016/0061175 A1* | 3/2016 | Bauer | ................... | F02N 15/046 74/6 |
| 2018/0030944 A1 | 2/2018 | Raad | | |
| 2018/0233992 A1* | 8/2018 | Takeuchi | ............... | H02K 11/02 |

FOREIGN PATENT DOCUMENTS

| | | | |
|---|---|---|---|
| EP | 0619427 B1 | 10/1994 | |
| JP | 2000104650 A | 4/2000 | |
| JP | 2003148317 A | 5/2003 | |
| JP | 2014075866 A * | 4/2014 | |
| WO | WO-2016075789 A1 * | 5/2016 | ........... B62D 5/0406 |

OTHER PUBLICATIONS

Quanbao Zhou, John Houldcroft, "Cold engine cranking torque requirement analysis," SAE International Inc., 2007, JSAE 20077002.
Hao et al., Utility U.S. Appl. No. 15/961,176, filed Apr. 24, 2018.
Gopalakrishnan et al., Utility U.S. Appl. No. 15/967,961, filed May 1, 2018.
Hao et al., Utility U.S. Appl. No. 15/417,734, filed Jan. 27, 2017.
Hao et al., Utility U.S. Appl. No. 15/158,887, filed May 19, 2016.
Namuduri et al., Utility U.S. Appl. No. 15/452,312, filed Mar. 7, 2017.

* cited by examiner

ON-AXIS BRUSHLESS STARTER ASSEMBLY

INTRODUCTION

The present disclosure relates to an on-axis brushless electric starter assembly for an internal combustion engine.

A typical internal combustion engine frequently uses an electric starter to turn the engine's crankshaft leading up to a start event to initiate a combustion start of the engine. A typical starter includes a pinion gear that is driven by an electric motor, and that is pushed out for engagement with a ring gear that is attached to the engine's crankshaft flywheel or flex-plate, in order to start the engine.

In some vehicle applications, a stop-start system is employed, where the engine is automatically stopped or shut off to conserve fuel when vehicle propulsion is not required, and is then automatically re-started by such a starter when drive torque is again requested. Such a stop-start system may be employed in a conventional vehicle having a single powerplant, or in a hybrid vehicle application that includes both an internal combustion engine and a motor/generator for powering the vehicle.

The electric starter can be an electric motor having contact brushes to conduct current between stationary wires on a stator portion and moving parts of a rotor portion. The physical contacts may wear over time. Additionally, a brushed motor delivers substantially zero torque near the upper bound of its available speed range.

SUMMARY

An electric starter assembly includes a partial planetary gear set operatively connected to a starter pinion gear configured to slide along a first axis. The starter assembly also includes a motor casing having a first bearing and configured to house a brushless electric motor. The brushless electric motor includes a multi-phase stator assembly arranged inside the motor casing concentrically with respect to the first axis and a rotor assembly arranged for rotation inside the stator assembly. The rotor assembly includes a rotor having a shaft arranged on the first axis, supported by the first bearing, and directly connected to a sun gear configured to engage the partial planetary gear set, and a rotor position and speed sensor target. The starter assembly additionally includes a motor end-cap configured to mate with and enclose the motor casing and having a second bearing configured to support the shaft for rotation with respect to the first axis. The starter assembly also includes an electronics cover having a power connector for receiving electrical power from an external power source and energy storage system and configured to mate with the motor end-cap and house an electronic commutator assembly. The electronic commutator assembly includes a power electronics assembly, and a control processor electronics assembly arranged between the motor end-cap and the power electronics assembly.

The electric starter assembly may also include a gear-set casing configured to house the partial planetary gear set and be fixed to the motor casing, for example via a suitable fastener.

The partial planetary gear set may include an internal ring gear fixed to the gear-set casing and a plurality of pinion gears in mesh with the internal ring gear.

The electric starter assembly may additionally include a solenoid assembly having a pinion-shift solenoid arranged on a second axis that is parallel to the first axis. The pinion-shift solenoid may be fixed to the gear-set casing, for example via a suitable fastener. The pinion-shift solenoid may also be configured to shift or slide the starter pinion gear along the first axis via a lever arrangement for meshed engagement with an external ring gear connected to a crankshaft of an engine in order to start the engine.

The partial planetary gear set and the starter pinion gear are part of a first subassembly; the solenoid assembly may be part of a second subassembly; the motor casing, the electric motor, and the motor end-cap may be part of a third subassembly; and the electronics cover and the electronic commutator assembly may be part of a fourth subassembly. In such an embodiment, the first subassembly may be configured to be pre-assembled with the second subassembly, the third subassembly may be configured to be assembled with the pre-assembled first and second subassemblies, and the fourth subassembly may be configured to be assembled with the pre-assembled first, second, and third subassemblies.

The rotor position and speed sensor target may be configured as a diametrically magnetized magnet fixed to the rotor shaft.

The control processor electronics assembly may include a processor circuit board and a rotor position and speed sensor configured to cooperate with the rotor position and speed sensor target.

The power electronics assembly may include a power circuit board, an electrical current ripple filter, and a heat sink configured to absorb heat energy from the power circuit board.

The power electronics assembly may additionally include a thermally conductive electrical insulator arranged between the power circuit board and the heat sink.

The electrical current filter may include a plurality of filter capacitors arranged on a pitch circle centered on and perpendicular to the first axis and between the power circuit board and the processor circuit board along the first axis.

A vehicle employing an internal combustion engine including a crankshaft connected to a ring gear and configured to be selectively activated to generate torque is also provided. The vehicle also includes an electrical power source and energy storage system and an electronic controller. Furthermore, the vehicle includes the electric starter assembly, as disclosed above, in operative communication with the electrical power source and energy storage system and the electronic controller and configured to selectively apply an input torque to the ring gear to activate the engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
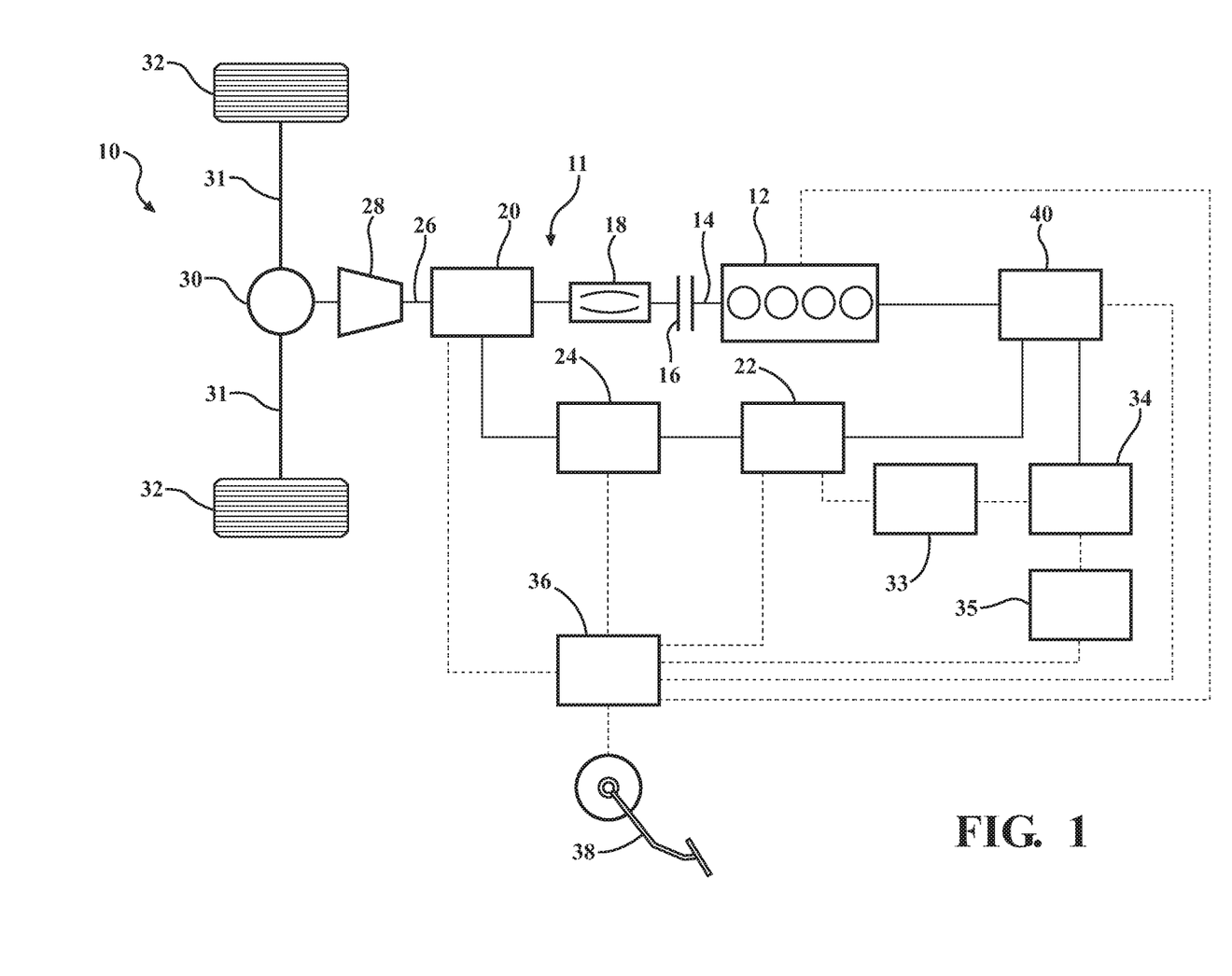
FIG. 1 is a system schematic of a vehicle including a propulsion system with an internal combustion engine and a brushless electric starter therefor.

Referring to the drawings, wherein like reference numbers refer to like components, FIG. 1 shows a system schematic of a vehicle 10 having a driveline 11. The vehicle 10 may have a propulsion system employing solely an internal combustion engine 12. Alternatively, the vehicle 10 may be a hybrid electric vehicle (HEV) having a powertrain employing both the internal combustion engine 12 and an electric propulsion source. In the case of the HEV embodiment of the vehicle 10, either or both of the engine 12 and the electric propulsion source may be selectively activated to provide propulsion based on the vehicle operating conditions.

The internal combustion engine 12 outputs torque to a shaft 14. One or more decoupling mechanisms may be included along the shaft 14 to decouple output of the engine 12 from the remaining portions of the powertrain. A clutch 16 is provided to allow selection of a partial or complete torque decoupling of the engine 12. The clutch 16 may be a friction clutch having a plurality of friction plates at least partially engaged when the clutch is closed to transfer torque, and disengaged when the clutch is opened to isolate torque flow between the downstream portions of the powertrain and the engine 12. A torque converter 18 may also be included to provide a fluid coupling between the output portion of engine 12 and downstream portions of the vehicle driveline 11. The torque converter 18 operates to smoothly ramp up torque transfer from the engine 12 to the rest of the driveline 11. Also, the torque converter 18 allows a decoupling of the engine 12, such that the engine may continue to operate at low rotational speed without generating propulsion of the vehicle 10, e.g., at stationary idle conditions.

In the case of the HEV embodiment of the vehicle 10, the electric propulsion source may be a first electric machine 20 powered by a high-voltage external power source and energy storage system 22 including a high-voltage traction battery. Generally, a high-voltage traction battery is one that has an operating voltage greater than about 36 volts but less than 60 volts. For example, the traction battery may be a lithium ion high-voltage battery with a nominal voltage of 48 volts. In the HEV embodiment of the vehicle 10, high-voltage direct current is conditioned by an inverter 24 before delivery to the first electric machine 20. The inverter 24 includes a number of solid state switches and a control circuit operating to convert the direct current into three-phase alternating current to drive the first electric machine 20.

Additionally, in the case of the HEV powertrain, the first electric machine 20 may have multiple operating modes depending on the direction of power flow. In a motor mode, power delivered from the high-voltage traction battery allows the first electric machine 20 to generate output torque to a shaft 26. The output torque of the first electric machine 20 may then be transferred through a variable ratio transmission 28 to facilitate selection of a desired gear ratio prior to delivery of output torque to a final drive mechanism 30. The final drive mechanism 30 may be a multi-gear differential configured to distribute torque to one or more side- or half-shafts 31 coupled to wheels 32. The first electric machine 20 may be disposed either upstream of the transmission 28, downstream of the transmission 28, or integrated within a housing of the transmission 28.

The first electric machine 20 may also be configured to operate in a generation mode to convert rotational motion of various driveline 11 components into electrical power for storage in the traction battery 22. When the vehicle 10 is moving, whether propelled by the engine 12 or coasting from its own inertia, rotation of the shaft 26 turns an armature, or rotor, (not shown) of the first electric machine 20. Such rotational motion causes an electromagnetic field to generate alternating current that is passed through the inverter 24 for conversion into direct current. The direct current may then be provided to the high-voltage traction battery to replenish the charge stored at the battery. A unidirectional or bidirectional DC-DC converter 33 may be used to charge a low-voltage (e.g., 12 volt) battery 34 and supply the low voltage loads 35, such as 12 volt loads. When a bidirectional DC-DC converter 33 is used, it is possible to jump start the high-voltage traction battery 22 from the low-voltage battery 34.

The various propulsion system components discussed herein may have one or more associated controllers to control and monitor operation. An electronic controller 36, although schematically depicted as a single controller, may also be implemented as a system of cooperative controllers to collectively manage the propulsion system. Multiple controllers may be in communication via a serial bus (e.g., Controller Area Network (CAN)) or via discrete conductors. The controller 36 includes one or more digital computers, each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various herein discussed propulsion system components. The controller 36 is in communication with the engine 12 and receives signals indicative of at least engine speed, temperature, as well as other engine operating conditions. The controller 36 may also be in communication with the first electric machine 20 and receive signals indicative of motor speed, torque, and the first electric machine's current draw. The controller 36 may also be in communication with the high-voltage traction battery 22 and receive signals indicative of such status indicators as a battery state of charge (SOC), temperature, and current supplied or absorbed by the battery. The controller 36 may also receive signals indicative of the circuit voltage across the high-voltage bus. The controller 36 may further be in communication with one or more sensors arranged at driver input pedal(s) 38 to receive signals indicative of specific pedal position, which may reflect acceleration demand by the driver. The driver input pedal(s) 38 may include an accelerator pedal and/or a brake pedal. In alternative embodiments such as a self-driving autonomous vehicle, acceleration demand may be determined sans driver interaction by a computer either on-board the vehicle 10 or external to the vehicle.

As mentioned above, in the case of the HEV embodiment of the vehicle 10, either one or both of the engine 12 and the first electric machine 20 may be operated at a particular time based at least on the propulsion requirements of the subject vehicle. During high torque demand conditions, the controller 36 may cause both, the engine 12 and the first electric machine 20 to be activated, such that each of the propulsion sources provides respective output torque for simultaneous or combined propulsion of the vehicle 10. In certain moderate torque demand conditions, generally the engine 10 operates efficiently and may be used as the sole propulsion source. For example, during highway driving of the HEV at a generally constant speed, the first electric machine 20 may be deactivated, such that only the engine 12 provides output torque.

Under other operating conditions of the HEV, the engine 12 may be deactivated, such that only the first electric machine 20 provides output torque. The clutch 16 may be opened to decouple the shaft 14 from the downstream portions of the powertrain. Specifically, during coast conditions where the HEV's driver allows the vehicle 10 to decelerate under driveline and road friction, as well as air resistance, the engine 12 may be deactivated and the first electric machine 20 operated in generator mode to recover energy. Additionally, even in a vehicle 10 using only the engine 12 for propulsion, deactivation of the engine 12 may be desirable during a temporary vehicle stop, such as at a traffic light. Instead of allowing the engine 12 to idle, fuel consumption may be reduced by deactivating the engine while the vehicle 10 is stationary. In both examples, it may be beneficial to rapidly restart the engine 12 in response to a subsequent resumption or increase of propulsion demand. A prompt startup of the engine 12 may avoid roughness and/or latency in power delivery being perceived by a driver of the vehicle 10.

The vehicle 10 also includes a second electric machine 40. The second electric machine 40 is coupled to the engine 12. The second electric machine 40 operates as an engine starter, and the entire assembly thereof is herein designated via the numeral 40. When the starter assembly 40 is engaged with the engine 12 leading up to a combustion cycle, the starter turns a crankshaft of the engine to facilitate a cold start or a restart thereof. Specifically, the starter assembly 40 is configured to engage with and selectively apply an input torque to a, typically external, ring gear 12A that is attached to a crankshaft flywheel or flex-plate (not shown) of the engine 12, in order to start the engine. According to aspects of the present disclosure, the controller 36 is programmed to issue a command to start the engine 12 using the starter assembly 40 in response to an acceleration demand, such as detected via sensor(s) (not shown) at driver input pedal(s) 38, following a period of reduced acceleration demand.

Figure 2:
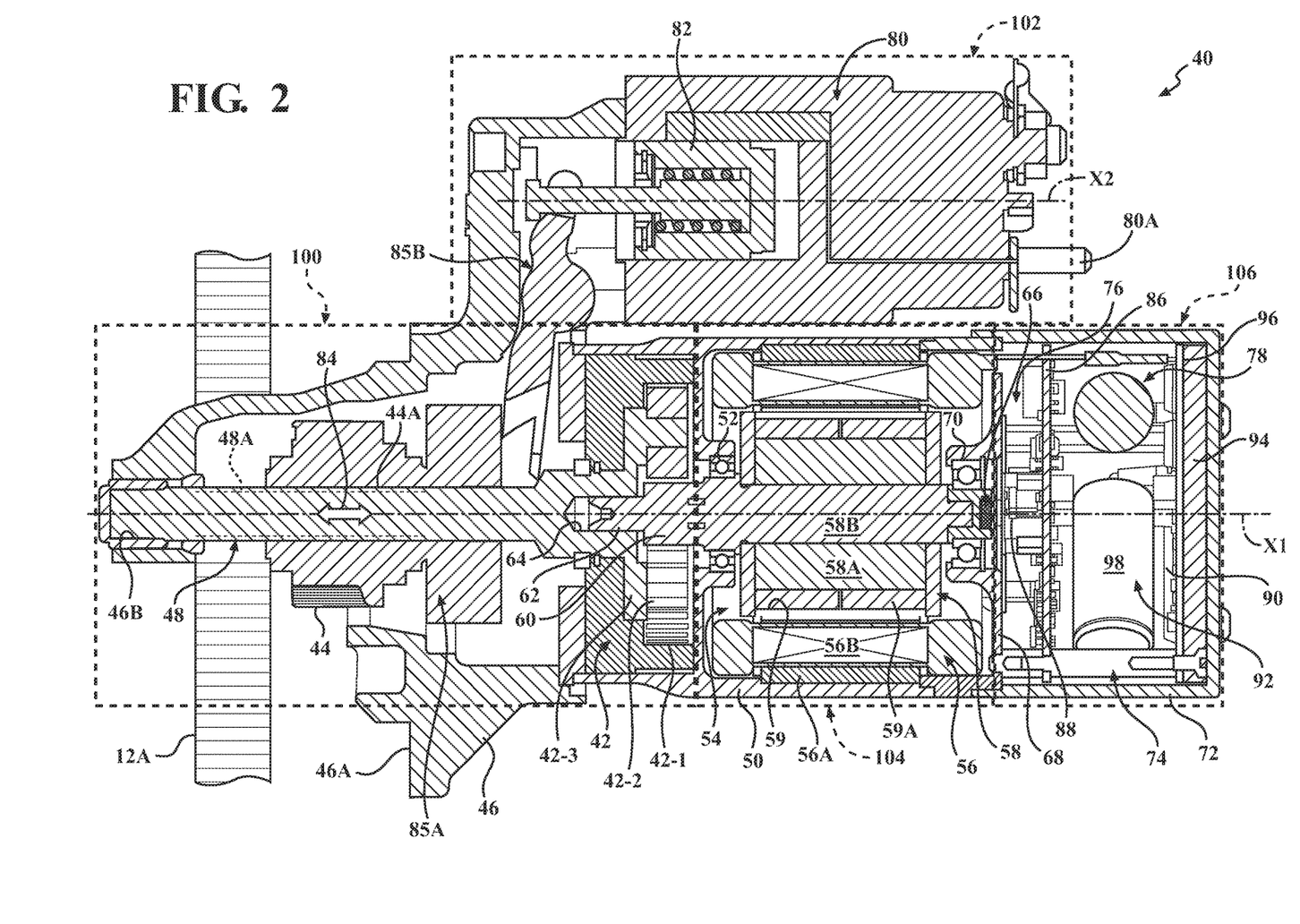
FIG. 2 is a cross-sectional view of the electric starter shown in FIG. 1.
Figure 3:
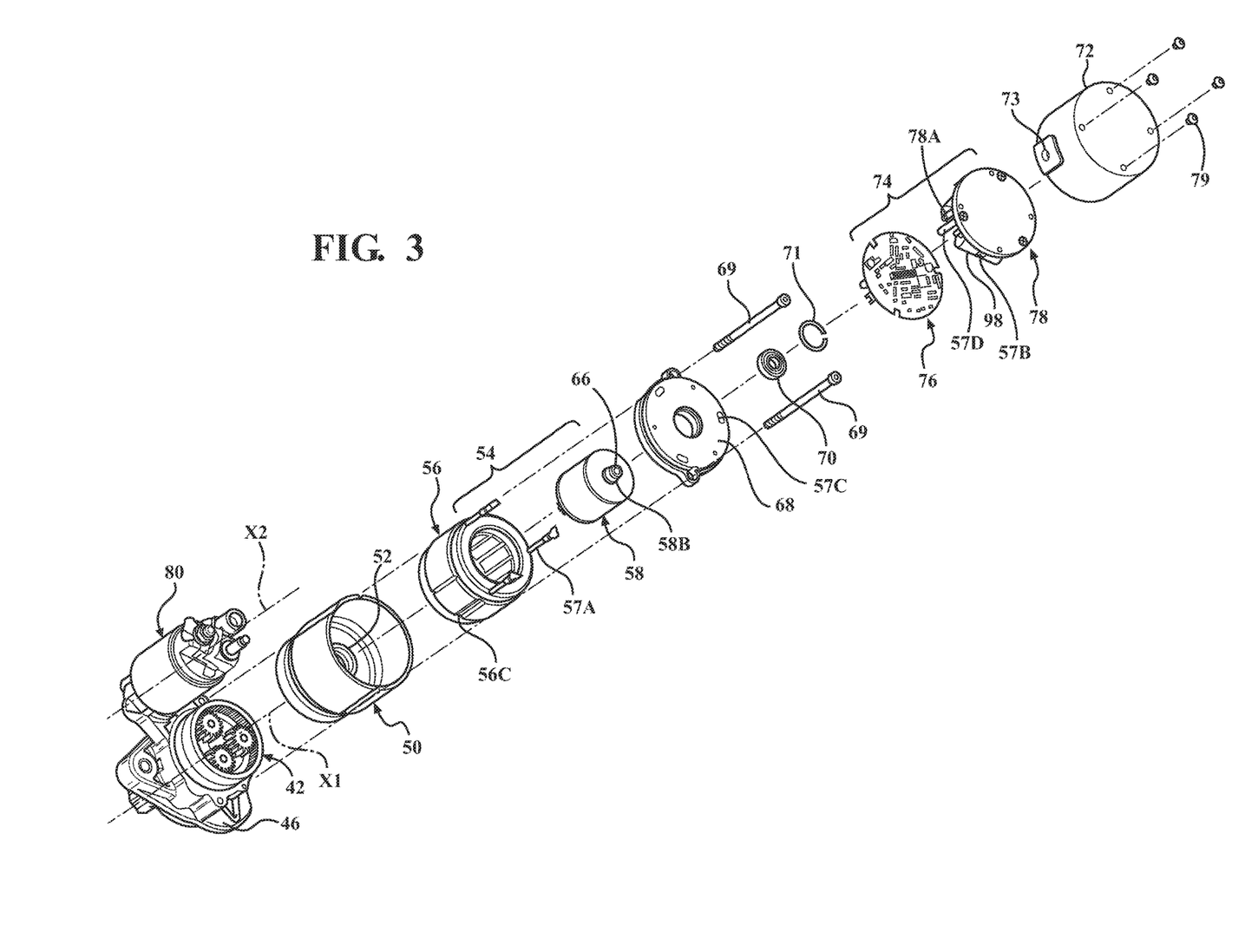
FIG. 3 is an exploded perspective back view of the electric starter shown in FIG. 2.
Figure 4:
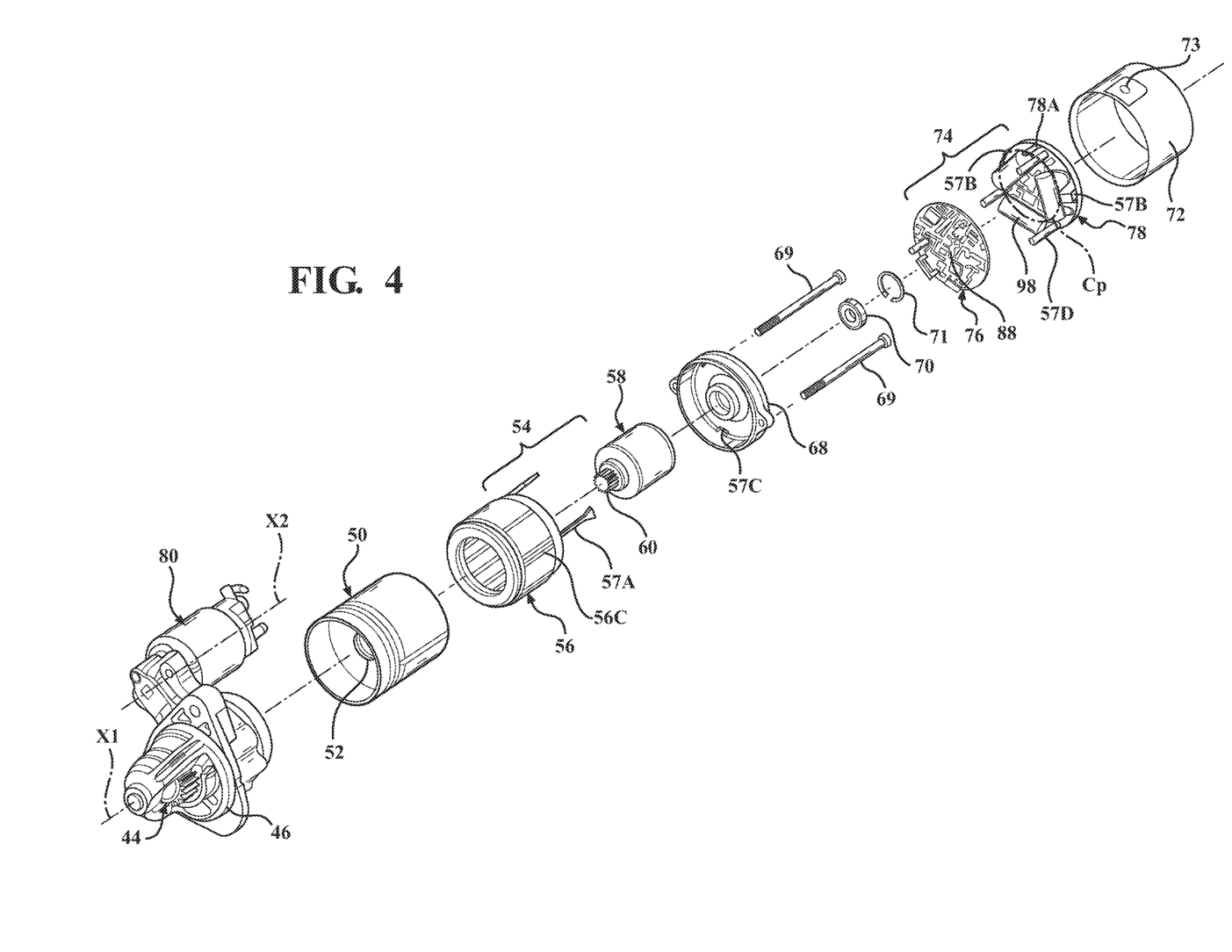
FIG. 4 is an exploded perspective front view of the electric starter shown in FIGS. 2 and 3.

As shown in FIGS. 2-4, the starter assembly 40 is configured as an on-axis electric machine. As defined herein, "on-axis" denotes that the starter assembly 40 is designed and constructed such that the starter's gear-train components, electric motor, and electronic commutator assembly electronics, to be described in detail below, are all arranged essentially on a common first axis X1. The starter assembly 40 includes a partial planetary gear set 42 operatively connected to a starter pinion gear 44, which is configured to slide along the first axis X1. The partial planetary gear set 42 provides a required speed reduction, such as between 25:1 and 55:1, to output an appropriate amount of engine cranking torque. As shown in FIGS. 2-4, the starter assembly 40 includes a gear-set casing 46 configured to house the partial planetary gear set 42 and having a mounting flange 46A for attachment to the engine 12 via appropriate fasteners.

The partial planetary gear set 42 includes an internal ring gear 42-1 fixed to the gear-set casing 46. The partial planetary gear set 42 further includes a plurality of pinion gears 42-2 in mesh with the internal ring gear 42-1, and a planet carrier 42-3 configured to hold the pinion gears. Specifically, the partial planetary gear set 42 may be directly connected to the starter pinion gear 44 via a shaft 48. To such an end, the shaft 48 may include an external spline 48A, while the pinion gear 44 includes a matching internal spline 44A, such that the pinion gear is enabled to slide along the pinion shaft 48 when the pinion gear 44 is pushed out for engagement with the ring gear 12A. As shown, the gear-set casing 46 is configured to support a nose of the shaft 48 via a bearing surface 46B.

The starter assembly 40 also includes a motor casing 50. The gear-set casing 46 may be fixed to the motor casing 50, such as via a suitable fastener (not shown). The motor casing 50 includes a first bearing 52 and is configured to house a brushless electric motor 54. The brushless electric motor 54 may, for example, be any of a number of motor types, such as an induction machine, a surface mount permanent magnet (PM) machine, an interior PM machine, a synchronous reluctance machine, a PM assist synchronous reluctance machine, a drag-cup induction machine, or a switched reluctance machine. The brushless electric motor 54 may also be a radial or an axial flux machine. The wire selection on the brushless electric motor 54 may, for example include a single wire conductor, which may have a round, square, or rectangular cross-section, which may be used for concentrated or distributed winding.

As compared with brushed electric motors, brushless motors generally benefit from increased duration of usable life due to the elimination of physical wear from contact of brushes at the commutator. Further, an electronically commutated electric machine may be capable of more precise control of motor speed as compared to a brushed motor. In some examples, the second electric machine may be operated using a field weakening control strategy to further improve control of the power output and extend motor speed. According to aspects of the present disclosure, the rotation of the starter assembly 40 output is synchronized with the rotation of the ring gear 12A to reduce noise, vibration, and harshness (NVH) which may occur during an engine 12 restart event.

Referring to FIG. 2 depicting a cross-section of the starter assembly 40, and its exploded view in FIG. 3, the electric motor 54 includes a multi-phase stator assembly 56 having a stator core 56A arranged inside the motor casing 50 concentrically with respect to the first axis X1. As shown in FIG. 3, the stator assembly 56 also includes three equally spaced electrical connectors 57A. A number of windings 56B is provided on the stator core 56A to generate a rotating magnetic field. The electric motor 54 also includes a rotor assembly 58 arranged for rotation inside the stator assembly 56. The rotor assembly 58 includes a rotor 58A. The electric motor 54 is driven when the windings 56B are sequentially powered to create a rotating electromagnetic field, and the rotor assembly 58 is caused to rotate when the stator 56A is thus energized. As shown in FIGS. 3-4, the stator assembly 56 may be fixed to the motor casing 50 via one or more keys 56C to orient the stator leads in a predetermined position with respect to the motor housing 50.

The stator core 56A is generally cylindrical in shape, and defines a hollow central portion to receive the rotor 58A. According to at least one example, outer diameter of the stator core 56A may be limited to no greater than 80 millimeters. The rotor 58A is configured to rotate relative to the stator core 56A about the first axis X1. The rotor 58A may be formed in layers, or laminations, which are stacked in an axial direction along the first axis X1 where the lamination stack defines an active length of the starter assembly 40. According to one example, the lamination stack length is limited to be no greater than 40 millimeters. The overall size of the starter assembly 40 may be dependent on engine 12 packaging constraints, such that a ratio of the outer diameter of the stator core 56A to the lamination stack length is between about 1.5 and 3.5.

The rotor 58A may define a plurality of openings 59 disposed near the outer perimeter portion of the rotor, and each opening may be configured to hold a permanent magnet 59A. The openings 59 are sized to enhance manufacturability, for example having an opening width of at least about 2 millimeters. The plurality of permanent magnets 59A may be formed from a type of iron-based alloy, such as neodymium, and cooperate to generate a magnetic field which interacts with the stator when energized to cause movement of the rotor 58A. For example, each of the permanent magnets 59A may be rectangular in shape to enhance simplicity and reduce manufacturing costs. However, other magnet shapes may be suitable for specific application of the brushless electric motor 54, according to the present disclosure.

The permanent magnets 59A are arranged to create a number of magnetic poles around the rotor 58A. Each of the permanent magnets 59A is affixed within one of the openings 59 of the rotor 58A and functions as a magnetic pole of the rotating electric machine. A magnetic flux is generated in a direction normal to the magnet 59A body. The openings 59 of the rotor 58A may be shaped to include air gaps (not shown) on either side of each permanent magnet 59A. Such air gaps between each pole may be sized to reduce flux leakage between the magnetic poles of the rotor 58A. Each permanent magnet 59A is oriented to have an opposing direction of polarity with respect to adjacent magnets in order to generate magnetic flux in opposite directions. The number of poles may be selected according to performance requirements of the electric motor 54.

The rotor assembly 58 also includes a shaft 58B. The shaft 58B is arranged on the first axis X1, supported by the first bearing 52, and directly connected to a sun gear 60 configured to engage the partial planetary gear set 42. As shown, the sun gear 60 may be integrally formed with the shaft 58B. A nose 62 of the shaft 58B may be piloted via a bearing surface 64 configured within the shaft 48, such that the shaft 48 and the shaft 58B each rotate about the first axis X1. The rotor assembly 58 also includes a rotor position and speed sensor target 66. As shown in FIG. 2, the rotor position sensor target 66 may be configured as one or more diametrically magnetized (shown in FIGS. 2 and 3) or radially magnetized (not shown) magnets affixed to the rotor shaft 58B.

The electric motor 54 also includes a motor end-cap 68 configured to mate with and enclose the motor casing 50. As shown in FIGS. 3 and 4, the motor end-cap 68 may be fastened to the gear-set casing 46 via a plurality of bolts 69, and thus retain the electric motor 54 and the motor casing 50 therebetween. The motor end-cap 68 includes a second bearing 70 configured to support the shaft 58B for rotation with respect to the first axis X1. As shown in FIGS. 3 and 4, a snap ring 71 may be employed to retain the second bearing 70 within the motor end-cap 68. The electric motor 54 additionally includes an electronics cover 72 having a power connector aperture 73 (shown in FIGS. 3 and 4) for receiving electrical power from the high-voltage external power source and energy storage system 22.

The electric motor 54 may additionally include a control signal connector (not shown) for communicating with the controller 36 to receive start/stop commands. As shown in FIGS. 3 and 4, the electronics cover 72 is configured to mate with the motor end-cap 68 and house or enclose an electronic commutator assembly 74. The electronic commutator assembly 74 includes a control processor electronics assembly 76 and a power electronics assembly 78. The control processor electronics assembly 76 is arranged between the motor end-cap 68 and the power electronics assembly 78. Accordingly, as shown, the electric motor 54 is arranged or sandwiched between the partial planetary gear set 42 and the electronic commutator assembly 74, while the partial planetary gear set 42 is arranged between the starter pinion gear 44 and the electric motor 54. The electronics cover 72 may be attached to the power electronics assembly 78 via appropriate fasteners, such as screws 79 shown in FIG. 3.

As further shown in FIGS. 3 and 4, the power electronics assembly 78 includes an electrical terminal 78A configured to align with the power connector aperture 73 and receive electrical power from the high-voltage external power source and energy storage system 22 or low voltage battery 34. To facilitate assembly of the electronic commutator assembly 74 with the electric motor 54, the motor end-cap 68 defines three apertures 57C configured to permit the three electrical connectors 57A to pass therethrough for engagement with electrical terminals 57B on the power electronics assembly 78 (shown in FIG. 4). As shown, the power electronics assembly 78 may also include stand-offs or spacers 57D for establishing appropriate relative positioning of the electronic commutator assembly 74 with respect to the electric motor 54 along the first axis X1.

As shown in FIGS. 2-4, the starter assembly 40 additionally includes a solenoid assembly 80. The solenoid assembly 80 includes a pinion-shift solenoid 82 arranged on a second axis X2, which is arranged parallel to the first axis X1. The pinion-shift solenoid 82 is configured to be energized by electrical power from the high-voltage external power source and energy storage system 22, for example, received at a coil terminal 80A. The solenoid assembly 80 is configured to be mounted and fixed to the gear-set casing 46, such as via a snap ring or other suitable fastener(s). The solenoid assembly 80 is further configured to shift or slide the starter pinion gear 44 along the first axis X1, as indicated by arrow 84 for meshed engagement with the ring gear 12A to restart the engine 12 upon a command from the controller 36. The pinion-shift solenoid 82 may shift the starter pinion gear 44, for example, via a one way-clutch 85A, and a lever and bearing arrangement 85B (shown in FIG. 2).

The control processor electronics assembly 76 may include a processor circuit board 86 arranged substantially perpendicular to the first axis X1, and one or more rotor position and speed sensors 88 (shown in FIGS. 2 and 4), such as Hall-effect sensors, configured to cooperate with the rotor position and speed sensor target 66. The position and speed sensor 88 is arranged to maintain a predetermined distance, e.g., 0.5 mm-1.5 mm, from the target magnet 66 at the end of the rotor shaft 58B. The power electronics assembly 78 may include a power circuit board 90 arranged substantially parallel to the processor circuit board 86, an electrical current ripple filter 92, and a heat sink 94 configured to absorb heat energy from the power circuit board 90. The power electronics assembly 78 may additionally include a thermally conductive electrical insulator 96 arranged between the power circuit board 90 and the heat sink 94. The electrical current ripple filter 92 may include a plurality of filter capacitors 98 arranged on a pitch circle Cp (shown in FIG. 4) centered on and substantially perpendicular to the first axis X1. As shown in FIGS. 2-4, each of the plurality of filter capacitors 98 is arranged generally parallel to the power circuit board 90, between the power circuit board and the processor circuit board 86 along the first axis X1.

The partial planetary gear set 42, along with the gear-set casing 46, and the starter pinion gear 44 may be part of a first subassembly 100. The solenoid assembly 80 may be part of a second subassembly 102. The motor casing 50, the electric motor 54, and the motor end-cap 68 may be part of a third subassembly 104. The electronics cover 72 and the electronic commutator assembly 74 may be part of a fourth subassembly 106. According to the present disclosure, the first subassembly 100 may be configured to be pre-assembled with the second subassembly 102, the third subassembly 104 may be configured to be assembled with the pre-assembled first and second subassemblies 100, 102, and the fourth subassembly 106 is configured to be assembled with the pre-assembled first, second, and third subassemblies 100, 102, 104 to provide a complete electric starter assembly 40. Furthermore, prior to individual subassemblies being assembled into the electric starter assembly 40, each of the first, second, third, and fourth subassemblies 100, 102, 104, 106 may be separately and individually tested against respective preset operating parameters to verify each subassembly's required performance.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric starter assembly comprising:
a partial planetary gear set operatively connected to a starter pinion gear configured to slide along a first axis;
a motor casing including a first bearing and configured to house a brushless electric motor, the brushless electric motor including:
a multi-phase stator assembly arranged inside the motor casing concentrically with respect to the first axis; and
a rotor assembly arranged for rotation inside the stator assembly;
wherein the rotor assembly includes a rotor having a shaft arranged on the first axis, supported by the first bearing;
a sun gear directly connected to the rotor shaft and configured to engage the partial planetary gear set; and
a rotor position and speed sensor target arranged on the rotor shaft;
a motor end-cap configured to mate with and enclose the motor casing and including a second bearing configured to support the rotor shaft for rotation with respect to the first axis;
an electronics cover having a power connector for receiving electrical power from an external power source and energy storage system and configured to mate with the motor end-cap; and
an electronic commutator assembly configured to be housed in the electronics cover;
wherein:
the electronic commutator assembly includes a power electronics assembly, and a control processor electronics assembly arranged between the motor end-cap and the power electronics assembly;
the control processor electronics assembly includes a processor circuit board and a rotor position and speed sensor configured to cooperate with the rotor position and speed sensor target;
the power electronics assembly includes:
a power circuit board;
an electrical current ripple filter;
a heat sink arranged between the electronics cover and the motor end-cap, attached to the motor end-cap, and configured to absorb heat energy from the power circuit board; and
a plurality of stand-offs configured to establish relative positioning of the electronic commutator assembly with respect to the electric motor along the first axis;
the electrical current filter includes a plurality of evenly spaced filter capacitors arranged on a pitch circle centered on and perpendicular to the first axis and between the power circuit board and the processor circuit board along the first axis; and
each of the plurality of filter capacitors is arranged between two of the plurality of stand-offs.

2. The electric starter assembly of claim 1, further comprising a gear-set casing configured to house the partial planetary gear set and be fixed to the motor casing.

3. The electric starter assembly of claim 2, wherein the partial planetary gear set includes an internal ring gear fixed to the gear-set casing and a plurality of pinion gears in mesh with the internal ring gear.

4. The electric starter assembly of claim 3, further comprising a solenoid assembly having a pinion-shift solenoid arranged on a second axis, wherein the second axis is parallel to the first axis, and configured to be fixed to the gear-set casing and to shift the starter pinion gear along the first axis for meshed engagement with an engine ring gear connected to an engine crankshaft to start the engine.

5. The electric starter assembly of claim 4, wherein:
the partial planetary gear set and the starter pinion gear are part of a first subassembly;
the solenoid assembly is part of a second subassembly;
the motor casing, the electric motor, and the motor end-cap are part of a third subassembly;
the electronics cover and the electronic commutator assembly are part of a fourth subassembly; and
the first subassembly is configured to be pre-assembled with the second subassembly, the third subassembly is configured to be assembled with the pre-assembled first and second subassemblies, and the fourth subassembly is configured to be assembled with the pre-assembled first, second, and third subassemblies.

6. The electric starter assembly of claim 1, wherein the rotor position and speed sensor target is configured as a diametrically magnetized magnet fixed to the rotor shaft.

7. The electric starter assembly of claim 1, wherein the power electronics assembly additionally includes a thermally conductive electrical insulator arranged between the power circuit board and the heat sink.

8. A vehicle propulsion system comprising:
an internal combustion engine including a crankshaft connected to a ring gear and configured to be selectively activated to generate torque;
an electrical power source and energy storage system;
an electronic controller; and an electric starter assembly in operative communication with the electrical power source and energy storage system and the electronic controller and configured to selectively apply an input torque to the ring gear to activate the engine, the electric starter assembly including:
  a partial planetary gear set operatively connected to a starter pinion gear configured to slide along a first axis;
  a motor casing including a first bearing and configured to house a brushless electric motor, the brushless electric motor including:
    a multi-phase stator assembly arranged inside the motor casing concentrically with respect to the first axis; and
    a rotor assembly arranged for rotation inside the stator assembly;
    wherein the rotor assembly includes a rotor having a shaft arranged on the first axis, supported by the first bearing;
    a sun gear directly connected to the rotor shaft and configured to engage the partial planetary gear set; and
    a rotor position and speed sensor target arranged on the rotor shaft;
  a motor end-cap configured to mate with and enclose the motor casing and including a second bearing configured to support the rotor shaft for rotation with respect to the first axis;
  an electronics cover having a power connector for receiving electrical power from the external power source and energy storage system and configured to mate with the motor end-cap; and
  an electronic commutator assembly configured to be housed in the electronics cover;
  wherein:
    the electronic commutator assembly includes a power electronics assembly, and a control processor electronics assembly arranged between the motor end-cap and the power electronics assembly;
    the control processor electronics assembly includes a processor circuit board and a rotor position and speed sensor configured to cooperate with the rotor position and speed sensor target;
    the power electronics assembly includes:
      a power circuit board;
      an electrical current ripple filter;
      a heat sink arranged between the electronics cover and the motor end-cap, attached to the motor end-cap, and configured to absorb heat energy from the power circuit board; and
      a plurality of stand-offs configured to establish relative positioning of the electronic commutator assembly with respect to the electric motor along the first axis:
    the electrical current filter includes a plurality of evenly spaced filter capacitors arranged on a pitch circle centered on and perpendicular to the first axis and between the power circuit board and the processor circuit board along the first axis; and
    each of the plurality of filter capacitors is arranged between two of the plurality of stand-offs.

9. The vehicle propulsion system of claim 8, further comprising a gear-set casing configured to house the partial planetary gear set and be fixed to the motor casing.

10. The vehicle propulsion system of claim 9, wherein the partial planetary gear set includes an internal ring gear fixed to the gear-set casing and a plurality of pinion gears in mesh with the internal ring gear.

11. The vehicle propulsion system of claim 10, further comprising a solenoid assembly having a pinion-shift solenoid arranged on a second axis, wherein the second axis is parallel to the first axis, and configured to be fixed to the gear-set casing and, upon a command from the electronic controller, to shift the starter pinion gear along the first axis for meshed engagement with the engine ring gear to start the engine.

12. The vehicle propulsion system of claim 11, wherein:
  the partial planetary gear set and the starter pinion gear are part of a first subassembly;
  the solenoid assembly is part of a second subassembly;
  the motor casing, the electric motor, and the motor end-cap are part of a third subassembly;
  the electronics cover and the electronic commutator assembly are part of a fourth subassembly; and
  the first subassembly is configured to be pre-assembled with the second subassembly, the third subassembly is configured to be assembled with the pre-assembled first and second subassemblies, and the fourth subassembly is configured to be assembled with the pre-assembled first, second, and third subassemblies.

13. The vehicle propulsion system of claim 8, wherein the rotor position and speed sensor target is configured as a diametrically magnetized magnet fixed to the rotor shaft.

14. The vehicle propulsion system of claim 8, wherein the power electronics assembly additionally includes a thermally conductive electrical insulator arranged between the power circuit board and the heat sink.

* * * * *